(No Model.)
2 Sheets—Sheet 1.
J. N. JOHNSON.
HAND POWER MOTOR FOR STREET CARS.
No. 412,922.
Patented Oct. 15, 1889.
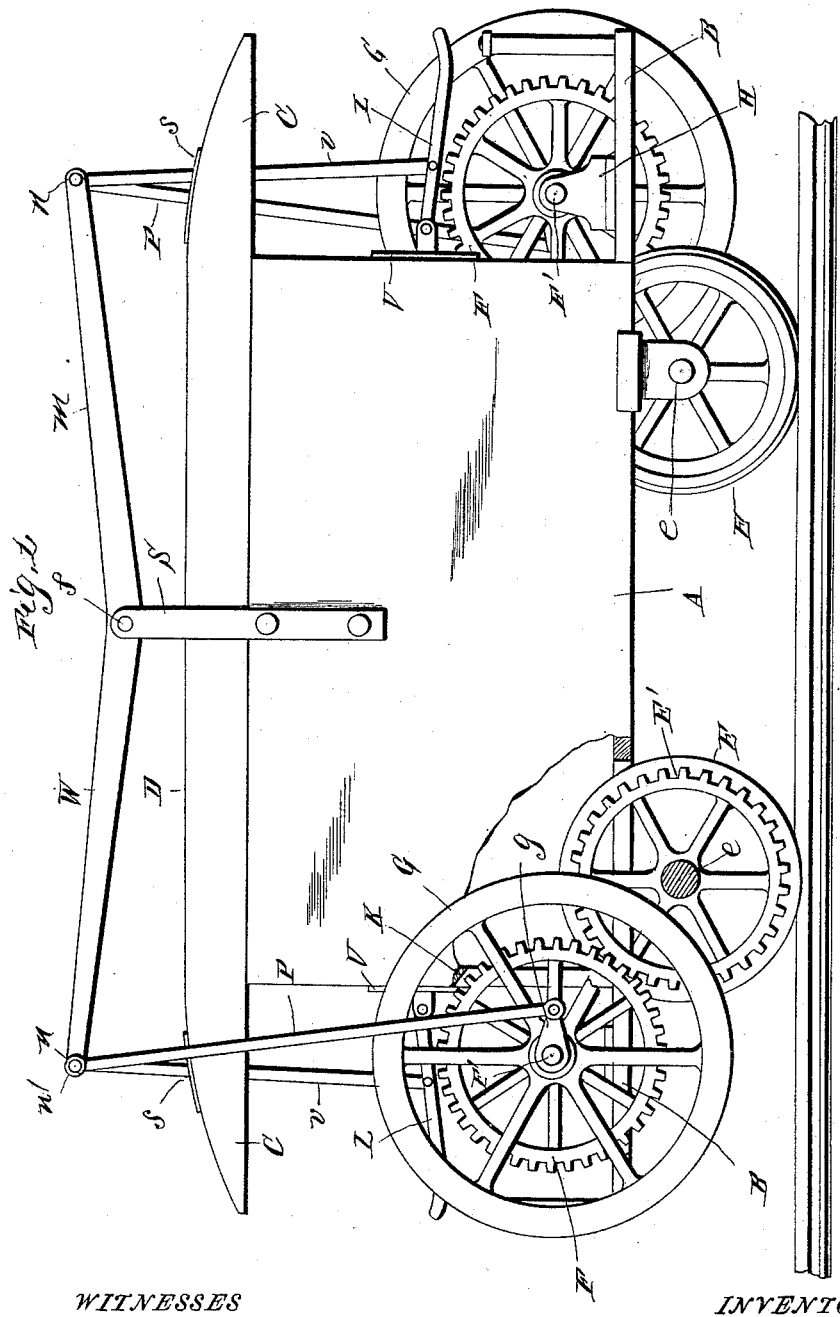
WITNESSES
C. L. Taylor
Villette Anderson.
INVENTOR
James N. Johnson
by O. W. Anderson,
Attorney (No Model.) 2 Sheets—Sheet 2.
J. N. JOHNSON.
HAND POWER MOTOR FOR STREET CARS.
No. 412,922. Patented Oct. 15, 1889.
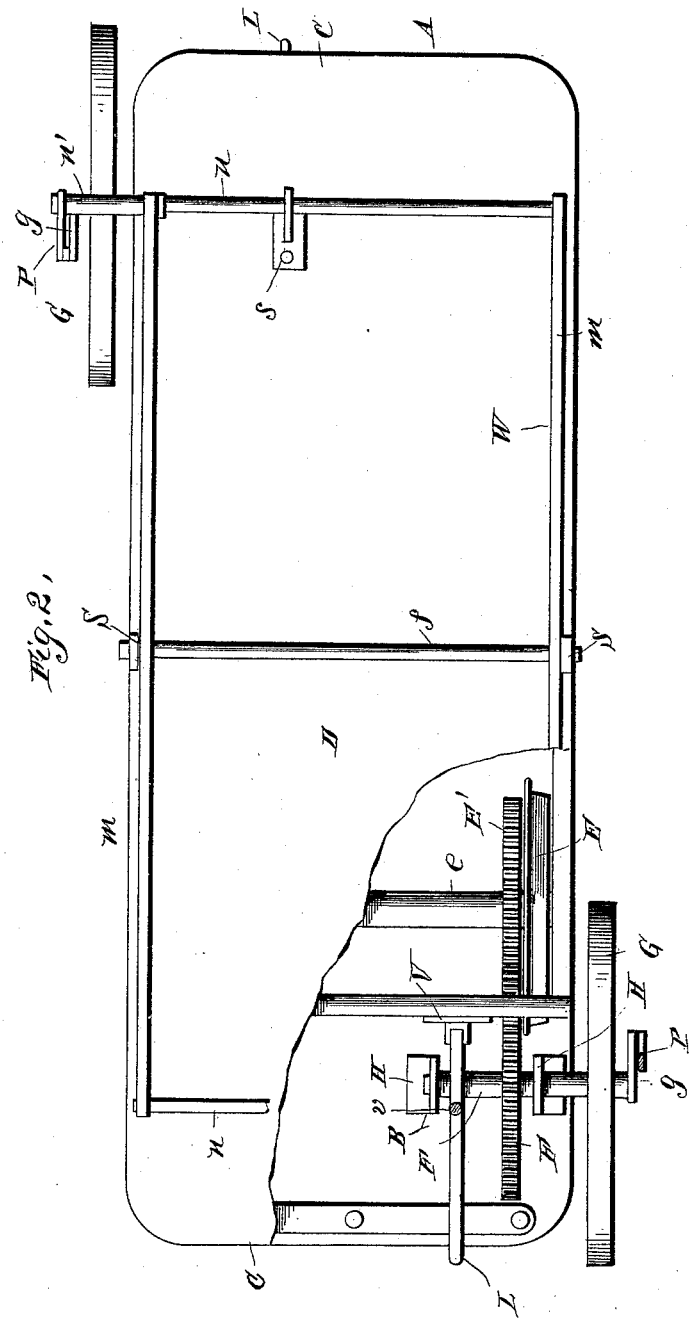
WITNESSES
C. L. Taylor
Villette Anderson
INVENTOR
James N. Johnson
by E. W. Anderson,
Attorney

UNITED STATES PATENT OFFICE.

JAMES N. JOHNSON, OF DECATUR, ILLINOIS.

HAND-POWER MOTOR FOR STREET-CARS.

SPECIFICATION forming part of Letters Patent No. 412,922, dated October 15, 1889.

Application filed June 29, 1889. Serial No. 316,067. (No model.)

*To all whom it may concern:*

Be it known that I, JAMES NORMAN JOHNSON, a citizen of the United States, and a resident of Decatur, in the county of Macon and State of Illinois, have invented certain new and useful Improvements in Hand-Power Street-Car Motors; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side view of this invention, showing a partial section. Fig. 2 is a top view of the same, a portion of the roof being broken away.

The object of the invention is to provide convenient hand-power mechanism for propelling street-cars; and it consists in the novel construction and combination of devices, all as hereinafter set forth, and pointed out in the appended claims.

In the accompanying drawings, the letter A designates the body of a street-car having at its ends the platforms B and over said platforms the projecting extensions C of the top D of the car.

The wheels E E of the car are located near the ends, and each pair of wheels is secured to its axle $e$, which is provided with a cogged wheel E' of somewhat less diameter than the wheel E, said cogged wheel being located near one end of the axle, just inside one of its wheels. The upper portion of said cogged wheel projects upward through the floor of the car to engage the wheel F, which is on the lateral driving-shaft F', which carries the large fly-wheel G on its outer end, and is provided with the crank $g$. The shaft F' is seated in bearings H on the side of the platform, and an opening or slot K is made through the end of the car at one side to admit the cogged wheel F to engagement with the gear-wheel E' of the carrying-wheels.

To the middle of the roof at its sides are secured the fulcrum-standards S, to which is pivoted a rectangular vibrating lever-frame W, the side bars $m$ of which are inclined from their middle points somewhat upward. These side bars are connected at their middle points by the transverse fulcrum-bar $f$, and at their ends by the transverse rods $n$, each of which has a lateral extension $n'$ beyond the side of the car, and is pivoted at the end of said extension to the vertical pitman P, which is connected at its lower end to the crank $g$ of the driving-shaft F'. The mechanism above described is duplicated at the other end of the car, and the connection between the cranks of the driving-shafts is made through the vertical pitmen P P by the rectangular lever-frame, the cranks being properly connected to the pitmen, so that the connecting lever-frame will work smoothly.

To the framing of the car at each end is secured a strong fulcrum-plate V, to which is pivoted the operating-lever L, and the transverse rod $n$ at the end of the lever-frame W is connected to said lever by means of a vertical connecting-rod $v$, which extends downward through a slotted plate $s$ in the projecting end portion of the car-roof.

The mechanism is designed to be operated at either or both ends of the car by means of the short levers L, which move the lever-frame, and thereby operate the crank-shafts and their gearing to turn the shafts of the carrying-wheels.

Having described this invention, what I claim, and desire to secure by Letters Patent, is—

1. The hand-power mechanism for propelling cars, consisting of the lever-frame W, pivoted by its middle portion to standards projecting above the car-top, the driving-shafts, their fly-wheels, gear-wheels, and cranks, the gear-wheels of the carrying-axles, the vertical pitmen connecting the cranks of the driving-shafts to the lever-frame, and the operating-levers pivoted to plates secured to the car-frame and connected by rods to the ends of the lever-frame, substantially as specified.

2. The combination, with the slotted end of a car, its top having fulcrum-standards projecting above its surface, and its platforms, of the lateral driving-shaft, their cranks, flywheels, and gear-wheels, the cogged wheels of the carrying-axles, the operating-levers at the ends of the car, the vibratory lever-frame above the car-top, and its connections to the cranks of the driving-shafts and the operating-levers, substantially as specified.

In testimony whereof I affix my signature in presence of two witnesses.

JAMES N. JOHNSON.

Witnesses:
D. K. TURLEY,
JOHN F. TURLEY.